3,258,777
FIBER OPTICS PRINTING PANEL FOR OSCILLOGRAPHS
Charles M. Redman, Las Cruces, N. Mex., assignor to the United States of America as represented by the Secretary of the Army
Filed Aug. 4, 1964, Ser. No. 387,534
7 Claims. (Cl. 346—107)

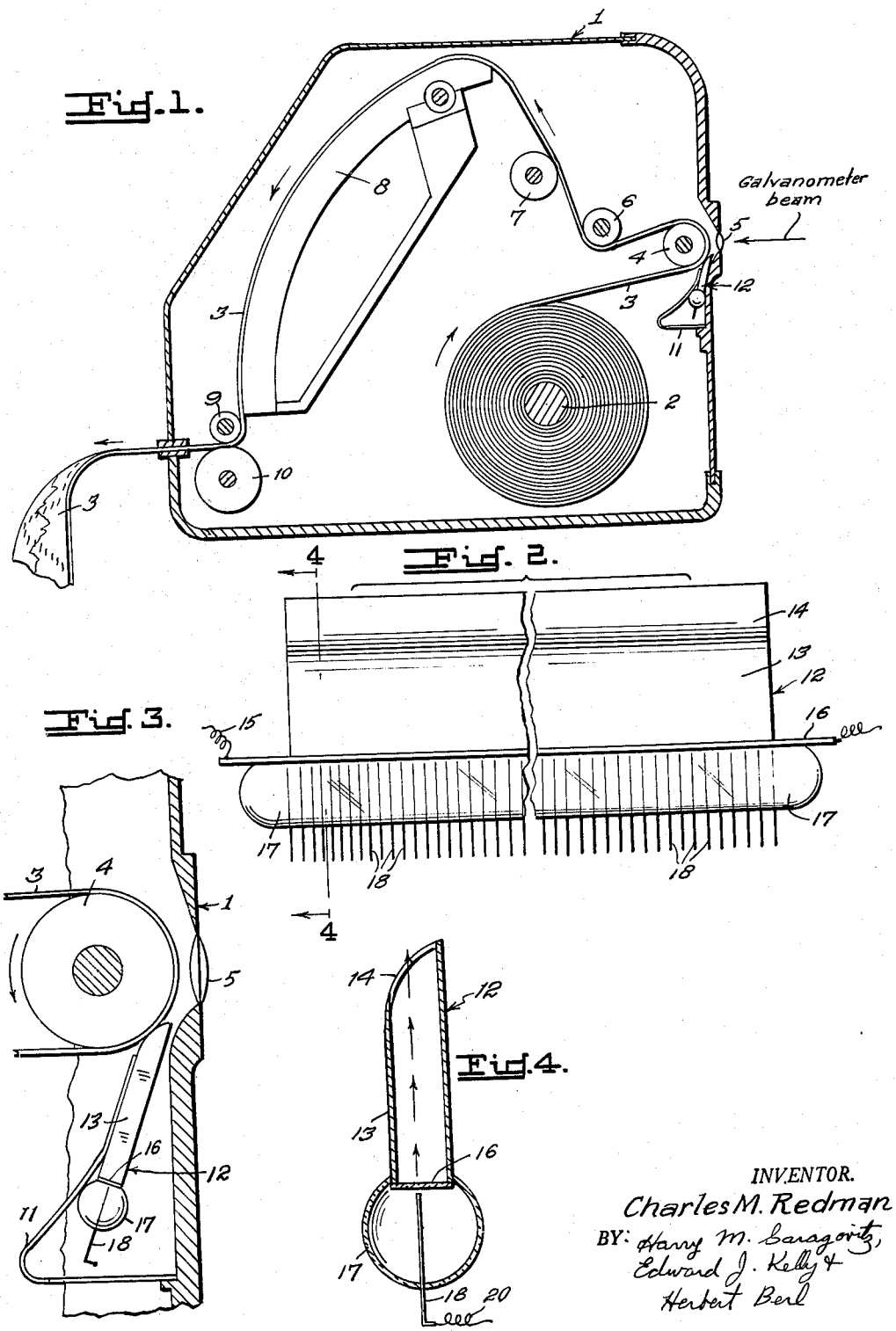

The invention described herein may be manufactured and used by or for the Government of the United States for governmental purposes, without the payment to me of any royalty thereon.

This invention relates to a fiber optics printing panel for oscillographs and more particularly for a device for recording arabic, binary and binary decimal numbers; frequency-intensity-time plots, point plots, etc., on oscillographic recording paper.

Briefly, the present invention comprises a fiber optical printing panel, a thin film transparent conductor along one edge of the panel with electric outlets at each end, a gas tube enclosing the end of the fiber optical printing panel with the thin film conductor and substantially 420 electrodes arranged in a row and extending from external to the gas tube, through the inside of the tube to a point close to the film conductor.

The device is mounted in an oscillograph magazine adjacent the recording paper of the oscillograph so that points of light from the device will contact the recording paper, there being substantially 420 light generating points provided.

It is a primary object of this invention to permit the use of oscillographs for tabulating data onto oscillographic recording paper.

It is another object to conduct a large number of electronically controllable points of light generated along the edge of a fiber optic printing panel through the fiber panel and onto oscillographic recording paper for the purpose of recording data thereon.

A further object is to record galvanometer traces and data tabulations on the same record.

The specific nature of the invention as well as other objects and advantages thereof, will clearly appear from a description of a preferred embodiment as shown in the accompanying drawings in which:

FIG. 1 is a sectional view of an oscillograph magazine with the fiber optics printing panel of the invention mounted thereon;

FIG. 2 is an elevational view of the fiber optics printing panel;

FIG. 3 is an enlarged sectional detail of the fiber optics panel and its relative position with respect to the oscillograph paper; and FIG. 4 is a section view taken along line 4—4 of FIG. 2.

Referring to the drawing, reference character 1 designates generally an oscillograph magazine case containing a paper feeding mechanism. The mechanism consists of a roller 2 carrying a supply of sensitized paper or film 3 which is fed over a metering roller 4. Roller 4 is disposed so that a beam from a galvanometer (not shown) passing through a collimating lens 5 is recorded on paper 3. The exposed paper is fed over guide rollers 6 and 7 and over a drying platen 8 and between an exit roller 9 and clutch roller 10 and out case 1.

A paper guide 11 is carried by and within case 1.

The magazine case 1 and elements 2–11 are standard and form no part of this invention and are shown for purposes of illustrating the position of the fiber optics panel which is indicated generally by 12.

Panel 12 is supported by the paper guide 11. Paper guide 11 may be a leaf spring, which may be altered so that it may be attached to the panel 12 to bias it towards the metering roll 4 and in proper contact therewith; the fiber panel then acting as a paper guide.

The fiber optics panel 12 of this invention is shown in detail in FIGS. 2 and 4. It consists of an elongated rectangular chute 13 having a rounded upper portion 14. A thin film transparent electrical conductor strip 16 is disposed along its lower edge. A gas filled tube 17 encloses the end of fiber panel 12 with the thin film conductor strip 16.

Electrodes 18 (substantially 420 in number) are arranged in a row and extend from a distance outside of and through gas tube 17 to terminate at a point close to the conductor strip 16.

The light guiding member 13 acts as an opaque chute fabricated from a fiber for guiding light rays and its thickness will be governed by its rigidity and mounting requirements. One end is curved to allow optimum exposure of the paper 3. Its width is substantially 11.5 inches plus, or minus, 0.12 inch long and one inch, plus or minus, 0.3 inch wide.

The thin transparent conductor 16, which is attached to the end of panel 12 opposite the end that contacts paper 3, will be of a material offering the lowest impedance to the flow of current and the maximum passage of light, and may consist of a transparent film which is impregnated with electroconductive particles, or yet having thin conducting wires imbedded therein.

The gas filled tube 17 extends the entire length of the panel 12 and the tube may be electrically connected by two wires 15 to each end of the conductor strip 16 through seals at each of its ends.

The 420 electrodes 18 are in parallel and are spaced evenly along the gas tube 17 and opposite to the transparent conductor strip 16. They extend far enough inside tube 17 so as to permit the electrodes 18 to be firmly connected. If desired, the outer ends of electrodes 18 may be alternately bent up to minus 90° and plus 90° to allow them to be connected to wires 20 leading to an electrical system such as a digital computor, etc.

On the inside of gas tube 17, electrodes 18 extend close to, but not touching the underside of the transparent conductor strip 16, the spacing being within 0.25 percent. For example, electrode number 200 will be placed 200/420 times 11.5 inches from electrode number 1 with 0.25 percent of 11.5 inches. The linear spacing of electrodes 18 shall vary by not more than 20 percent of the average spacing. The spacing of electrodes 18 from the transparent conductor strip 16 is sufficiently constant so that ionization at any electrode with respect to the strip 16 will not vary more than 10 percent from the average ionization level.

The end of each electrode 18 next to the transparent conductor strip 16 is so designed, that when an ionization potential is applied between the electrode and the transparent conductor strip 16, a point of light between 0.01 inch and 0.03 inch in diameter appears at the opposite edge of the fiber optic panel 13 from the ionization and is of suitable intensity and wave length to cause a satisfactory exposure of the paper 3 within 20 microseconds of time.

Wires 20, and wires 15 connected to the electrodes 18 and the transparent conductor strip 16, may be run along the inside of the paper guide 11 and half of the wires may come out at each end thereof. These wires may be numbered to correspond with its respective electrode or transparent conductor.

The fiber optic printing panel may be connected to a digital system to permit tabulation of a missile test, or to a spectrum analyzer.

By continuous activation of certain electrodes, grid lines could be printed on the paper 3.

It will be apparent that the present invention provides a means to print data, etc. on an oscillograph recording paper in addition to the oscillographic traces.

I claim:

1. In combination with an oscillograph magazine having a roll of sensitized paper for exposure to a galvanometer beam, a fiber optics printing panel mounted in said magazine adjacent said roll of sensitized paper for printing data on said paper, said fiber optics printing panel comprising a light guide, a conductor fixed to said guide, a gas filled tube enclosing one end of said light guide and said conductor, a plurality of electrodes, penetrating said gas filled tube and terminating near said conductor, the electrical energization of said electrodes and said conductor causing a point of light at each terminal of said electrodes whereby said points of light are conducted through said light guide to contact said sensitized paper.

2. The combination comprising, an oscillograph magazine having a mechanism for feeding sensitized paper for exposure to a galvanometer beam therein, a fiber optics printing panel mounted in said magazine, said fiber optics printing panel comprising a light guiding member having its upper end disposed adjacent said sensitized paper, an electrical conductor fixed to the lower end of said light guiding member, a gas filled tube enclosing the lower end of said light guiding member and said conductor and a plurality of aligned electrodes extending from a point substantially external of to a point inside said gas filled tube near the under side of said conductor, whereby when a said electrode and said conductor are energized a point of light generated between said conductor and said electrode will be conducted through said conductor and said light guiding member to contact said sensitized paper in advance of said galvanometer beam.

3. In a device as set forth in claim 2 wherein said lighting guide comprises an elongated rectangular chute having open ends, the upper end being rounded to permit optimum exposure of said sensitized paper by said points of light.

4. In a device as set forth in claim 2 wherein said electrical conductor comprises an elongated thin transparent film fixed to the lower end of said lighting guide, said conductor having a low impedance to electrical current and maximum transparency.

5. In a device as set forth in claim 2 wherein said gas filled tube extends the entire length of said lighting member.

6. In a device as set forth in claim 2 wherein said electrodes are arranged in a straight line and disposed normal to the longitudinal axis of said gas filled tube, said electrodes being symmetrically spaced.

7. In a device as set forth in claim 2 wherein said electrodes are spaced apart sufficient so that ionization at any of said electrodes with respect to said conductor will not vary more than 10 percent from the average ionization voltage level.

References Cited by the Examiner

UNITED STATES PATENTS

| | | | |
|---|---|---|---|
| 2,458,882 | 1/1949 | Stoner et al. | 346—107 |
| 2,532,731 | 12/1950 | Potter | 346—107 X |
| 2,952,504 | 9/1960 | Path | 346—107 |

LOUIS J. CAPOZI, *Primary Examiner.*